United States Patent
Sprigg

(10) Patent No.: US 6,862,452 B2
(45) Date of Patent: Mar. 1, 2005

(54) SYSTEM AND METHOD FOR PIGGYBACKING DATA ACROSS AN OPEN DATA CHANNEL OF A WIRELESS DEVICE

(75) Inventor: Stephen A. Sprigg, Poway, CA (US)

(73) Assignee: Qualcomm Inc., San Diego, CA (US)

(*) Notice: Subject to any disclaimer, the term of this patent is extended or adjusted under 35 U.S.C. 154(b) by 129 days.

(21) Appl. No.: 10/226,029

(22) Filed: Aug. 21, 2002

(65) Prior Publication Data

US 2004/0192319 A1 Sep. 30, 2004

(51) Int. Cl.$^7$ ................................................. H04Q 7/20
(52) U.S. Cl. ................................... 455/452.1; 455/450
(58) Field of Search ................................... 455/450, 451, 455/452.2, 412.2, 414.1, 464, 415, 417, 515–517, 525, 552.1

(56) References Cited

U.S. PATENT DOCUMENTS

| | | | | |
|---|---|---|---|---|
| 5,203,015 A | * | 4/1993 | George | 455/514 |
| 5,396,648 A | * | 3/1995 | Patsiokas et al. | 455/509 |
| 5,465,397 A | * | 11/1995 | Pickert | 455/62 |
| 5,570,413 A | * | 10/1996 | Ahlberg et al. | 455/550.1 |
| 5,790,955 A | * | 8/1998 | Tomoike | 455/453 |
| 5,845,212 A | * | 12/1998 | Tanaka | 455/437 |
| 6,023,609 A | * | 2/2000 | Futamura | 455/82 |
| 6,542,747 B1 | * | 4/2003 | Syukri | 455/450 |
| 6,567,672 B1 | * | 5/2003 | Park et al. | 455/574 |

\* cited by examiner

*Primary Examiner*—Jean Gelin
(74) *Attorney, Agent, or Firm*—Philip Wadsworth; Robert O'Connell

(57) ABSTRACT

A system, method, and program for transmitting data across an idle open communication channel from a wireless device. The wireless device includes a computer platform and a plurality of device resources that selectively utilize a open communication channel to communicate with other devices across the network, and each device resource selectively requests notification of an idle open communication channel, and all device resources that have requested such notification are notified upon an idle open communication channel occurring, and each notified device resource can selectively transmit data across the open communication channel prior to closure thereof.

15 Claims, 3 Drawing Sheets

SYSTEM AND METHOD FOR PIGGYBACKING DATA ACROSS AN OPEN DATA CHANNEL OF A WIRELESS DEVICE

BACKGROUND OF THE INVENTION

I. Field of the Invention

The present invention generally relates to computer networks and communications across computer networks. More particularly, the invention relates to the utilization of an idle open data channel by the device resources of a wireless device to communicate across a wireless network.

II. Description of the Related Art

Wireless computer devices that communicate data, typically in the form of packets, across a wireless or partially wireless computer network open a "data" or "communication" channel on the network such that the device can send and receive data packets. The computer devices often have computer device resources, such as programs and hardware components, which individually use open communication connections to transmit and receive data on the network. In existing networked computers, such as personal computers that connect through an Ethernet or other LAN, the device resources are polled when an open communication channel is present to see if the resource needs to send or receive data at that time. If the device resources do not need the open channel, then the device closes the open channel and simply reopens the channel if a device resource requires communication. Because the communication channel on the LAN is inexpensive to establish and utilize, the establishment of channels is transparent to the user.

However, a problem arises when a network communication channel between devices is expensive to establish, such as in a wireless network between wireless devices. One example of network having expensive communication channels is a cellular telecommunication network between cellular devices where every second of connectivity has an appreciable cost to the user. Cellular telecommunication devices have in many instances full computer functionality and device resources that need to communicate across the wireless network, and the device resources will communicate packets when an open communication channel is present, in a similar manner to a common Ethernet or LAN. However, conversely to a wire-based LAN, if a cellular telecommunication device resource needs to communicate across the network, it is not as desirous to establish a communication channel anew on the cellular network because such connection will effect a per second airtime charge. The cellular telecommunication device must therefore either open an expensive communication channel if the device resource communication requirement is sufficiently vital to offset the cost of doing so, or the device resource will simply wait until the user opens a communication channel intentionally and then communicate across the open channel prior to its closure.

Accordingly, it would be advantageous to provide a system and method that allows device resources to more efficiently use expensive bandwidth in network. The system and method should not cause interruption of other device functionality and other device resources that have priority in utilizing the open communication channel. It is thus to the provision of such a system and method to transmit data from device resources through expensive communication channels on a network that the present invention is primarily directed.

SUMMARY OF THE INVENTION

The present invention is a system, method, and computer program for transmitting data from the device resources of a wireless device across an idle open communication channel to a wireless network. The system includes one or more wireless devices that each selectively opens and closes a communication channel to the wireless network, and each wireless device has a computer platform and a plurality of device resources that selectively utilize a communication channel to communicate with other devices across the network. Each device resource can selectively request notification of an idle open communication channel and the system notifies all device resources that have requested such notification upon an idle open communication channel occurring whereby each notified device resource can selectively transmit data across the open communication channel prior to closure thereof.

The present invention further includes a method for transmitting data across an open communication channel on a wireless device that selectively opens and closes a communication channel to a wireless network, having the steps of requesting, from one or more device resources, notification of an idle open communication channel, then opening a communication channel from the wireless device to the wireless network, and upon the open communication channel becoming idle, notifying all device resources that have requested such notification, and then selectively transmitting data from one or more notified device resources across the open communication channel prior to closure thereof.

The present invention can particularly utilize the "lingering" of an open communication channel which is common on smart cellular devices. During the lingering of the channel, which occurs after and initial voice or data transmission, other device resources that need to communicate across the network can "piggyback" their data on the idle and open channel. The piggybacking of the data can be transparent to the user of the device.

It is therefore the primary object of the present invention to provide a system and method that leverages an idle open communication channel to transmit data from device resources instead of needing to bridge an expensive communication channel when communication is needed. The present invention can implement a priority of device resource communication access to insure that the most prudent data is transmitted across the idle open channel. Additionally, the present invention can be implemented on wireless devices embodied with linger timers, or can be constructed in either hardware components or software commands, or both. The present invention thus provides an advantage in that a wireless computer device, such as a cellular telecommunication device, can minimize the number of communication channel establishments necessary to provide adequate network access to the device resources.

Other objects, advantages, and features of the present invention will become apparent after review of the hereinafter set forth Brief Description of the Drawings, Detailed Description of the Invention, and the Claims.

DETAILED DESCRIPTION OF THE INVENTION

Figure 1:
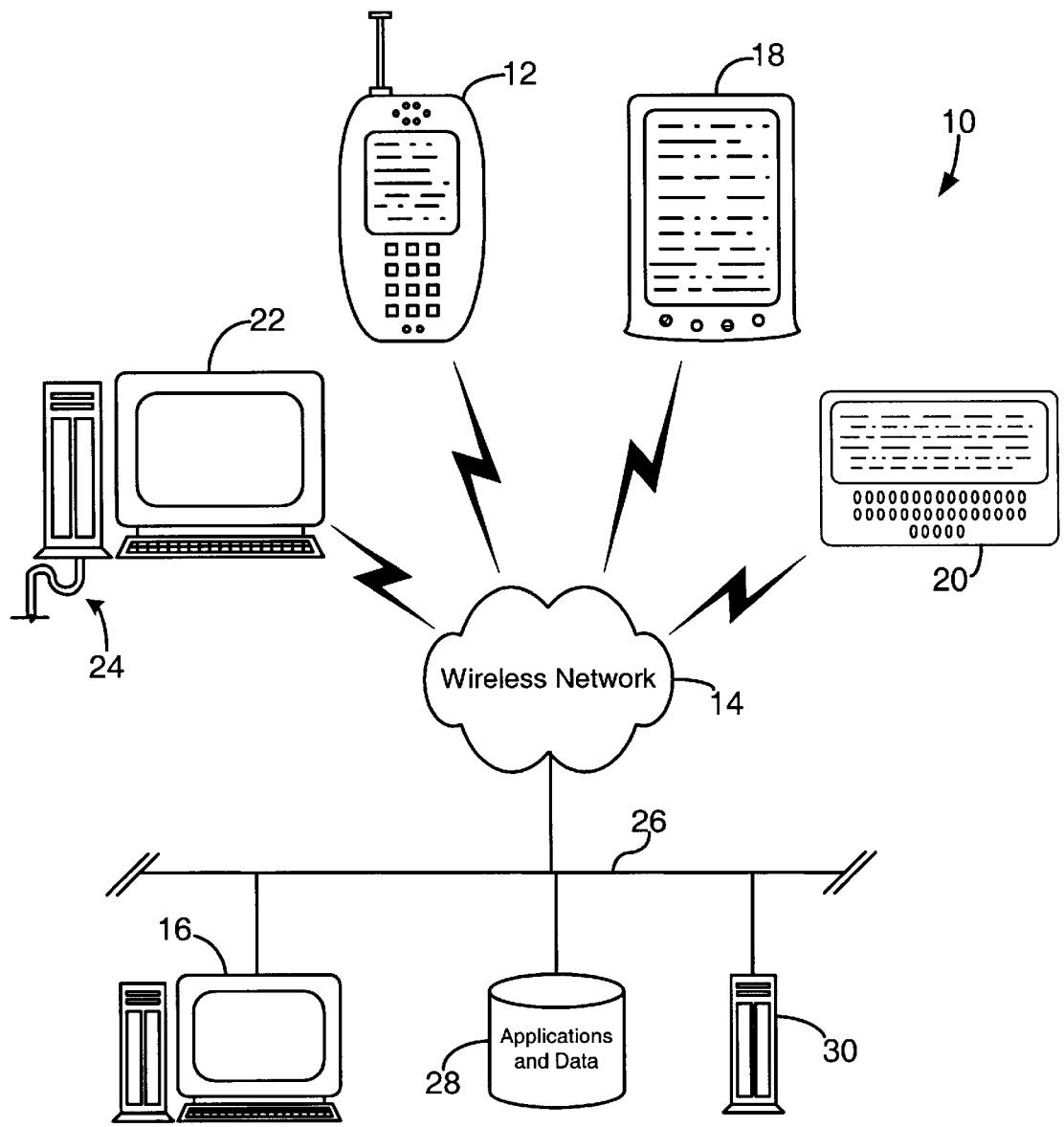
FIG. 1 is a representative diagram of a partial wireless network and partial LAN with several computer devices that communicate with each other across the network.

With reference to the figures in which like numerals represent like elements throughout, FIG. 1 illustrates the partially wireless network 10 having a plurality of computer devices 12, 16, 18, 20, 22, 28, 30 interconnected thereon. Such computer devices can include wireless devices, such as cellular telephone 12, in communication across a wireless network 14 and a LAN-based network 26, with at least one network server, such as application download server 16, that selectively downloads or provides access to software applications or other data to the wireless devices across a wireless communication portal or other data access to the wireless network 14. As shown here, the wireless device can be a cellular telephone 12, a personal digital assistant 18, a pager 20, which is shown here as a two-way text pager, or even a separate computer platform 22 that has a wireless communication portal, and may otherwise have a wired connection 24 to a network or the Internet. The inventive system and method can accordingly be performed on any form of computer device computer module including a wired or wireless communication portal, including without limitation, wireless modems, PCMCIA cards, access terminals, personal computers, access terminals, telephones without a display or keypad, or any combination or subcombination thereof.

The present invention is most advantageously utilized in a network where a communication channel has a significant overhead in its initial bridging. In wireless networks, or partially wireless networks, such as network 10 shown in FIG. 1, the communication channel must be initially bridged between at least the wireless device itself, such as devices 12, 18, 20, 22, and the wireless network 14, and the maintenance of the communication channel tends to be costly, especially in a cellular telecommunication network. The use of cellular telecommunication pathways has been increasing because wireless devices, such as cellular telephone 12, are being manufactured with increased computing capabilities and are becoming tantamount to personal computers and hand-held personal digital assistants ("PDAs"), communicating packets including voice and data over the wireless network. These "smart" cellular telephone have installed application programming interfaces ("APIs") onto their local computer platform that allow software developers to create software applications that operate on the cellular telephone, and control certain functionality on the device.

In many of the smart cellular devices, such as cellular telephone 12 or PDA 18, after the last point-to-point (PPP) connection has stopped being used by the device resource, the device waits for a certain "linger" time before fully terminating the connection. Thus, the present invention can be implemented upon the triggering of an extant linger timer on the wireless device, such as cellular telephone 12 or text pager 20, or the device can be modified to have a linger of an open communication channel after the initial use of the channel by the user or device resource has ceased. The linger timer, if present, can typically be altered through a software command to API of the platform of the computer device, such as devices 12, 18, 20, 22.

Figure 2:
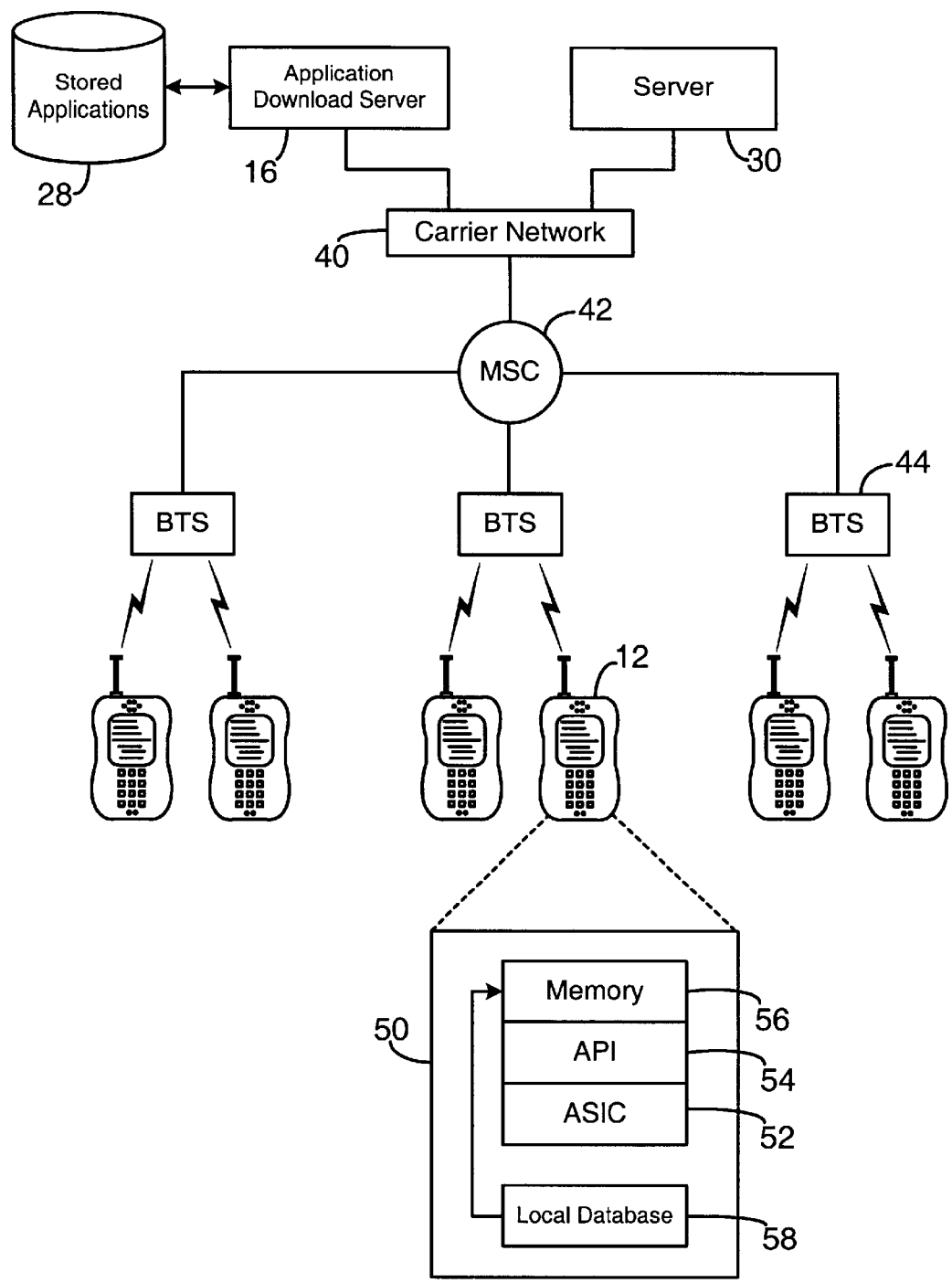
FIG. 2 is a block diagram of the hardware components of the wireless network providing communication between different wireless devices, an application download server, a second network server, and the stored application database.

FIG. 2 is a block diagram that more fully illustrates the components of a wireless network 14 and interrelation of the elements of the present inventive system. The wireless network 14 is merely exemplary and can include any system whereby remote modules, such as wireless devices 12, 18, 20, 22, communicate over-the-air between and among each other and/or between and among components of a wireless network 14, including, without limitation, wireless network carriers and/or servers. The application download server 16 and the stored applications database 28, other server 30, will be present on the cellular data network with any other components that are needed to provide cellular telecommunication services. The application download server 16, and/or other server 30 communicate with a carrier network 40, through a data link, such as the Internet, a secure LAN, WAN, or other network. The carrier network 40 controls messages (generally being data packets) sent to a messaging service controller ("MSC") 42. The carrier network 40 communicates with the MSC 42 by a network, the Internet, and/or POTS ("plain ordinary telephone system"). Typically, the network or Internet connection between the carrier network 40 and the MSC 42 transfers data, and the POTS transfers voice information. The MSC 42 is connected to multiple base stations ("BTS") 44. In a similar manner to the carrier network, the MSC 42 is typically connected to the BTS 44 by both the network and/or Internet for data transfer and POTS for voice information. The BTS 44 ultimately broadcasts messages wirelessly to the wireless devices, such as cellular telephone 12, by short messaging service ("SMS"), or other over-the-air methods known in the art.

Each wireless device, such as cellular telephone 12, has a computer platform 50 that can receive and execute software applications and display data transmitted from the application download server 16 or other network servers 30. The computer platform 50 also includes an application-specific integrated circuit ("ASIC") 52, or other processor, microprocessor, logic circuit, or other data processing device. The ASIC 52 is installed at the time of manufacture of the wireless device and is not normally upgradeable. The ASIC 52 or other processor executes the application programming interface ("API") layer 54 that interfaces with any resident programs in the memory 56 of the wireless device. The memory can be comprised of read-only or random-access memory (RAM and ROM), EPROM, EEPROM, flash cards, or any memory common to computer platforms. The computer platform 50 also includes a local database 58 that can hold the software applications, file, or data not actively used in memory 56, such as the software applications or downloaded from the application download server 16. The local database 58 is typically comprised of one or more flash memory cells, but can be any secondary or tertiary storage device as known in the art, such as magnetic media, EPROM, EEPROM, optical media, tape, or soft or hard disk.

Figure 3:
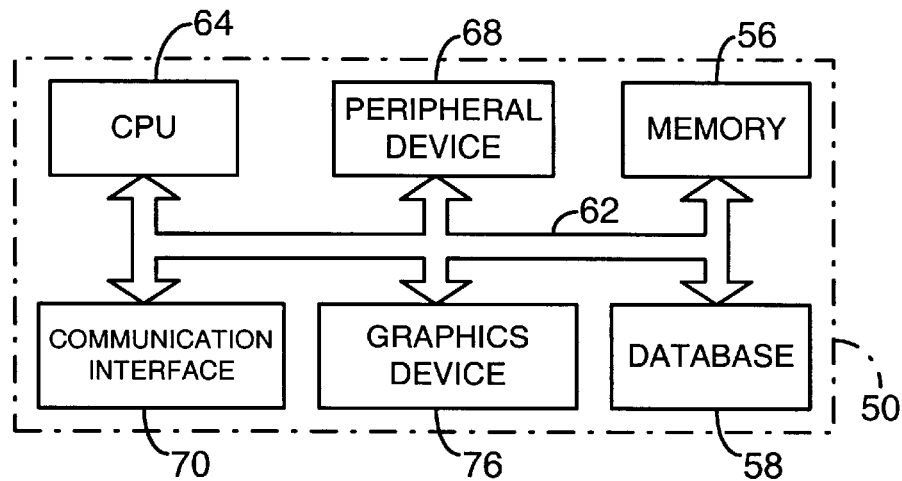
FIG. 3 is a block diagram of the computer platform of a wireless device using the present invention with several of the device resources connected to the communication interface of the device via a bus.

As shown more particularly in the block diagram of FIG. 3, each device, such as cellular telephone 12, has a computer platform 50 that can receive data, execute software applications, and display data transmitted from other computer devices, such as PDA 18 and application download server 16. The computer platform 50 includes a bus 62 that interconnects the device components. Among other components resident on the device platform 50 are several device resources: a central processing unit 64 (CPU), one or more peripheral devices 68, a communication interface 70, a memory 56, the secondary local database 58, and alternately, a graphics device 66. Other device resources can be separate programs executing on the CPU 64 or other processor of a component of the platform 50.

The system the transmits data across an open communication channel from wireless devices 12, 18, 20, 22 on a wireless network 14, where each device selectively opens and closes a communication channel to the wireless network 14, and each wireless device including a computer platform 50 with a plurality of device resources 56, 58, 64, 68, 70, 76 that each can selectively utilize a communication channel to communicate with other devices, such as another wireless device 12, 18, 20, 22 or server 16, across the network 10, and each device resource selectively requests the system to notify that device resource of an idle open communication channel, and the system notifies all device resources 56, 58, 64, 68, 70, 76 that have requested such notification upon an idle open communication channel occurring, and each notified device resource selectively transmits data across the open communication channel prior to closure thereof.

Many wireless devices, such as devices 12, 18, 20, 22, can delay the closing of an open communication channel after cessation of usage thereof by a device resource or the user with an encoded linger timer. The present invention allows other device resources to utilize this open channel prior to closure of the channel. Through requesting notification, the other device resources 56, 58, 64, 68, 70, 76 become aware of the idle open channel and if the resources need to communicate across the channel, the device resource can send or receive data across the open channel. The device resources can be allowed to sequentially transmit across the open channel through any priority system as known in the art such as round-robin polling, a priority queue, daisy-chain, or bus arbitration.

In one embodiment, the device resources 56, 58, 64, 68, 70, 76 each send a flag to request notification of an idle open channel, and the flags can be stored on the CPU 64, memory 56, or database 58. The system then notifies all device resources 56, 58, 64, 68, 70, 76 that sent a flag thereto upon an idle open communication channel occurring. In another embodiment, the device resources 56, 58, 64, 68, 70, 76 each prompt the system for notification of an idle open channel, and the system can keep the prompts in active memory 56, or records such prompts in a local database 58. The system then notifies all device resources 56, 58, 64, 68, 70, 76 that so prompted the system upon an idle open communication channel occurring.

If the wireless device 12, 18, 20, 22 allows an unused communication channel to idle (linger) for a predetermined duration until closure of the open channel, the system preferably notifies all device resources 56, 58, 64, 68, 70, 76 that have requested such notification of an idle open communication channel upon the predetermined duration of idling beginning, i.e. when the linger timer begins counting. Further, it is preferable that the system notifies all device resources that have requested such notification of an idle open communication channel within the predetermined duration. Accordingly, the closure of the idle communication channel can be overridden or reset if so desired in order that all device resources 56, 58, 64, 68, 70, 76 that need to communicate can use the open channel. Otherwise, to preserve the expensive bandwidth, the closure at the end of the predetermined duration can be absolute, and the device resources will simply wait until the next idle open communication channel.

Figure 4:
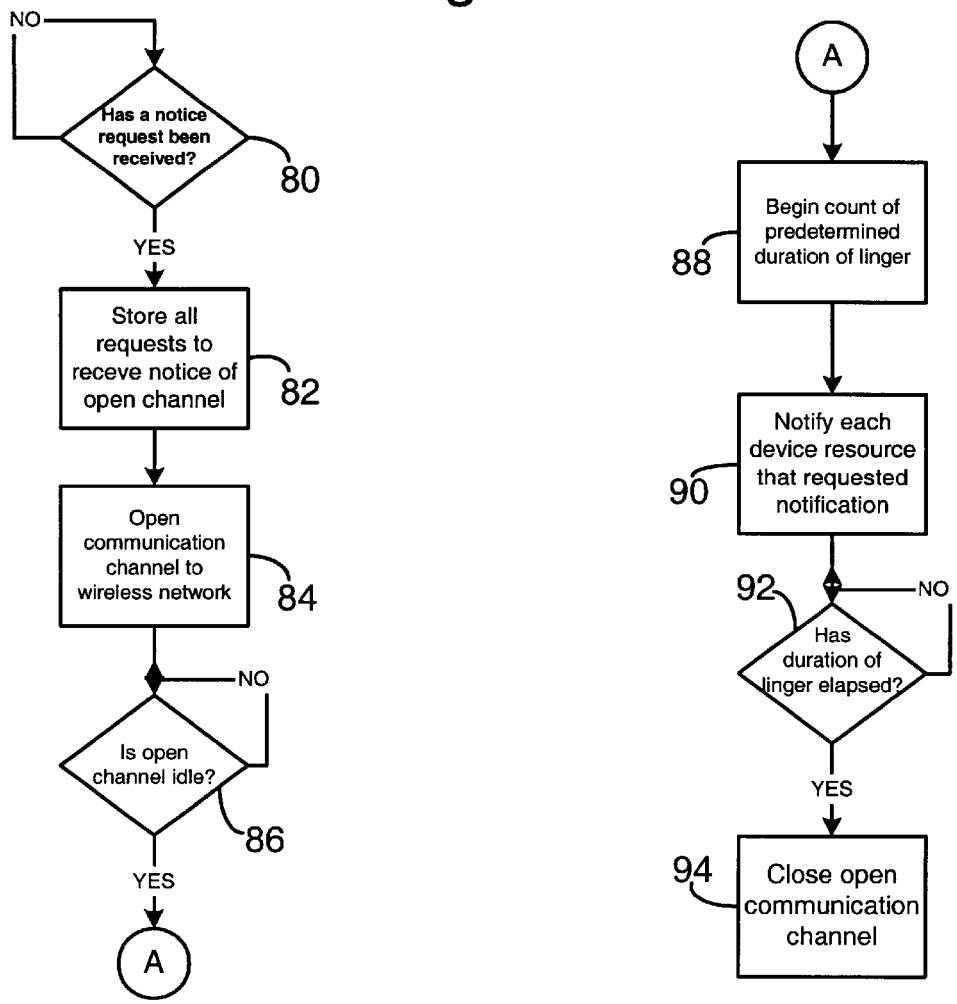
FIG. 4 is a flowchart of the process executed on the wireless device whereby device resources can request and receive notification of an idle open communication channel, and selectively transmit data thereacross.

The preferred process executed on the computer device, such as wireless devices 12, 18, 20, 22, is shown in the flowchart of FIG. 4, which can be a separate program or thread executing on CPU 64, or a subprogram that executes upon at least one device resource 56, 58, 64, 68, 70, 76 requesting notification of an idle open communication channel. A determination is made as to whether a request for notion of an idle open channel, as shown by decision 80. If not, the process enters a monitoring wait-state to determine when a request to receive notice is received. If at least one request for notice has been received at decision 80, then the system stores all request to receive notice of an idle open channel, as shown by step 82. The storage can occur in memory 56 or local database 58. Then the device at sometime thereafter opens a communication channel to the wireless network 14, as shown by step 84. The opening of the channel can occur by a user sending or receiving voice or data from the device 12, 18, 20, 22, or a device resource can trigger the initial communication if the device is so embodied. Moreover, if a large number of device resources 56, 58, 64, 68, 70, 76 need to communicate, the device can be embodied such that a communication channel will be established once a threshold number of resources need to communicate.

Once the open communication channel has commenced at step 84, a constant monitoring of the open channel to determine whether the channel has gone idle, as shown at decision 86. If the channel is not idle, the process enters a wait-state and constantly monitors the open channel. Once the open channel has idled, the device begins to count its predetermined duration of linger to keep the channel open, as shown at step 90. At the same time as beginning the linger count at step 88, or at sometime thereafter, the device notifies each device resource 56, 58, 64, 68, 70, 76 that requested notification of the idle open channel. Accordingly, step 90 can be iterated as necessary to notify all device resources. Either while the device resources are being notified at step 90, or thereafter as shown in the embodiment of FIG. 4, a determination is made as to whether the linger time has elapsed, as shown by decision 92. If the predetermined duration of linger has not elapsed at decision 92, then the process enters a monitoring wait-state at decision 92 and awaits the end of the duration of linger. Once the linger duration has elapsed at decision 92, the device closes the open communication channel as shown at step 94. The process then restarts upon one or more requests for notification of an open communication channel being received at decision 80.

Using the process of FIG. 4, the system accordingly provides a method for transmitting data across an open communication channel on a wireless device, such as devices 12, 18, 20, 22, that selectively opens and closes a communication channel to a wireless network 14. The method includes the steps of requesting, from one or more device resources 56, 58, 64, 68, 70, 76, notification of an idle open communication channel, opening a communication channel from the wireless device 12, 18, 20, 22 to the wireless network 14, upon the open communication channel becoming idle, notifying all device resources 56, 58, 64, 68, 70, 76 that have requested such notification, and selectively transmitting data from one or more notified device resources across the open communication channel prior to closure thereof. The step of requesting from one or more device resources can be a request from one or more software applications resident on the computer platform 50 of the wireless device 12, 18, 20, 22, or from one or more hardware components of the computer platform 50 of the wireless device 12, 16, 20, 22, as shown in FIG. 3. In one embodiment, the step of opening a communication channel from the wireless device 12, 18, 20, 22 to the wireless network 14 is opening a communication channel from a cellular device, such as cellular telephone 12 to a cellular telecommunication network, as shown in FIG. 2.

The step of requesting notification of an idle open communication channel can be sending a flag from the device resources 56, 58, 64, 68, 70, 76 to the system. Thus, the step of notifying all device resources 56, 58, 64, 68, 70, 76 that have requested such notification will then be notifying all device resources that sent a flag upon an idle open communication channel occurring. Alternately, the step of requesting notification of an idle open communication channel is prompting from the device resources 56, 58, 64, 68, 70, 76 to request notification of an open channel, and the method will then further include the step of recording such prompts, preferably either in memory 56 or a local database 58. Consequently, in such embodiment, the step of notifying all device resources 56, 58, 64, 68, 70, 76 that have requested such notification will be notifying all device resources that so prompted the system.

If the system is embodied to allow an unused communication channel to idle for a predetermined duration until closure, as described above, the step of notifying all device resources 56, 58, 64, 68, 70, 76 that have requested such notification of an idle open communication channel occurs upon the beginning of the predetermined duration of idling. The step of notifying all device resources 56, 58, 64, 68, 70, 76 that have requested such notification of an idle open communication channel occurs within the predetermined duration.

The present invention further includes a wireless device, such as cellular telephone 12, that selectively opens and closes a communication channel to a wireless network 14, that includes a computer platform 50 and a plurality of device resources 56, 58, 64, 68, 70, 76 that selectively utilize a communication channel to communicate with other computer devices, such as application download server 16 or database 28 across the network 10. The device resources of the wireless device selectively request notification of an idle open communication channel, and the wireless device notifies all device resources 56, 58, 64, 68, 70, 76 that have requested such notification upon an idle open communication channel occurring, and each notified device resource selectively transmits data across the open communication channel prior to closure thereof. The wireless device preferably is a cellular telecommunication device, such as cellular telephone 12 or text pager 20.

In one embodiment, the device resources 56, 58, 64, 68, 70, 76 each send a flag to request notification of an idle open channel, such as sending a flag to CPU 64, and the wireless device notifies all device resources that sent a flag thereto upon an idle open communication channel occurring. Alternately, each device resource prompts the communication interface 70 for notification of an idle open channel, and the communication interface 70 records such prompts, or a local database 58 on the bus 62 records the prompts, and notifies all device resources 56, 58, 64, 68, 70, 76 that so prompted the communication interface 70 upon an idle open communication channel occurring.

The device resources can be one or more software applications resident on the computer platform 50 of the wireless device 12, 18, 20, 22, or one or more hardware components of the computer platform 50 of the wireless device 12, 18, 20, 22. The wireless device further preferably allows an unused communication channel to idle, or linger, for a predetermined duration until closure, and notifies all device resources 56, 58, 64, 68, 70, 76 that have requested such notification of an idle open communication channel upon the predetermined duration of idling beginning, such notification occurring within the predetermined duration of linger.

In view of the inventive method being executable on the computer platform of a wireless device 12, 18, 20, 22, the present invention includes a program resident in a computer readable medium, where the program directs a computer device 12, 18, 20, 22 having a device platform 50 to perform the inventive steps of the method. Such program can be executed on any single computer platform, or can be multithreaded among several computer platforms.

The computer readable medium can be the memory 56 of the computer platform 50 of the cellular telephone 12, or other wireless device 18, 20, 22, or can be in a local database, such as local database 58 of the device platform 50. Further, the computer readable medium can be in a secondary storage media that is loadable onto a wireless device computer platform, such as a magnetic disk or tape, optical disk, hard disk, flash memory, or other storage media as is known in the art.

In the context of FIG. 4, the present inventive method may be implemented, for example, by operating portion(s) of the wireless network 14 and/or LAN 26 to execute a sequence of machine-readable instructions, such as device platform 50, the application download server 16, and secondary server 30. The instructions can reside in various types of signal-bearing or data storage primary, secondary, or tertiary media. The media may comprise, for example, RAM (not shown) accessible by, or residing within, the components of the wireless network 14 or LAN 26. Whether contained in RAM, a diskette, or other secondary storage media, the instructions may be stored on a variety of machine-readable data storage media, such as DASD storage (e.g., a conventional "hard drive" or a RAID array), magnetic tape, electronic read-only memory (e.g., ROM, EPROM, or EEPROM), flash memory cards, an optical storage device (e.g. CD-ROM, WORM, DVD, digital optical tape), paper "punch" cards, or other suitable data storage media including digital and analog transmission media.

While the foregoing disclosure shows illustrative embodiments of the invention, it should be noted that various changes and modifications could be made herein without departing from the scope of the invention as defined by the appended claims. Furthermore, although elements of the invention may be described or claimed in the singular, the plural is contemplated unless limitation to the singular is explicitly stated.

What is claimed is:

1. A system for transmitting data across an open communication channel from wireless devices on a wireless network, comprising:

one or more wireless devices that each selectively opens and closes a communication channel to the wireless network, and each wireless device including a computer platform; and each device including a plurality of device resources that selectively utilize a communication channel to communicate with other devices across the network, and each device resource selectively requests the system to notify that device resource of an idle open communication channel;

wherein the system notifies all device resources that have requested such notification upon an idle open communication channel occurring, and each notified device resource selectively transmits data across the open communication channel prior to closure thereof; and wherein the device resources each send a flag to the system to request notification of an idle open channel, and the system notifies all device resources that sent a flag thereto upon an idle open communication channel occurring.

2. A system for transmitting data across an open communication channel from wireless devices on a wireless network, comprising:

one or more wireless devices that each selectively opens and closes a communication channel to the wireless network, and each wireless device including a computer platform; and each device including a plurality of device resources that selectively utilize a communication channel to communicate with other devices across the network, and each device resource selectively requests the system to notify that device resource of an idle open communication channel;

wherein the system notifies all device resources that have requested such notification upon an idle open communication channel occurring, and each notified device resource selectively transmits data across the open communication channel prior to closure thereof; and wherein the device resources each prompt the system for notification of an idle open channel, and the system records such prompts and notifies all device resources that so prompted the system upon an idle open communication channel occurring.

3. The system of claim 2, wherein the wireless device allows an unused communication channel to idle for a predetermined duration until closure, and notifies all device resources that have requested such notification of an idle open communication channel upon the predetermined duration of idling beginning.

4. The system of claim 3, wherein the wireless device notifies all device resources that have requested such notification of an idle open communication channel within the predetermined duration.

5. A method for transmitting data across an open communication channel on a wireless device that selectively opens and closes a communication channel to a wireless network, and each wireless device including a computer platform and including a plurality of device resources that selectively utilize a communication channel to communicate with other devices across the network, the method comprising the steps of:

requesting, from one or more device resources, notification of an idle open communication channel;

opening a communication channel from the wireless device to the wireless network;

upon the open communication channel becoming idle, notifying all device resources that have requested such notification; and selectively transmitting data from one or more notified device resources across the open communication channel prior to closure thereof;

wherein the step of requesting, from one or more device resources, notification of an idle open communication channel is sending a flag to request notification of an open channel; and wherein the step of notifying all device resources that have requested such notification is notifying all device resources that sent a flag upon an idle open communication channel occurring.

6. A method for transmitting data across an open communication channel on a wireless device that selectively opens and closes a communication channel to a wireless network, and each wireless device including a computer platform and including a plurality of device resources that selectively utilize a communication channel to communicate with other devices across the network, the method comprising the steps of:

requesting, from one or more device resources, notification of an idle open communication channel;

opening a communication channel from the wireless device to the wireless network;

upon the open communication channel becoming idle, notifying all device resources that have requested such notification; and selectively transmitting data from one or more notified device resources across the open communication channel prior to closure thereof;

wherein the step of requesting, from one or more device resources, notification of an idle open communication channel is prompting to request notification of an open channel;

wherein the method further comprises the step of recording such prompts; and wherein the step of notifying all device resources that have requested such notification is notifying all device resources that prompted.

7. A method for transmitting data across an open communication channel on a wireless device that selectively opens and closes a communication channel to a wireless network, and each wireless device including a computer platform and including a plurality of device resources that selectively utilize a communication channel to communicate with other devices across the network, the method comprising the steps of:

requesting, from one or more device resources, notification of an idle open communication channel;

opening a communication channel from the wireless device to the wireless network;

upon the open communication channel becoming idle, notifying all device resources that have requested such notification; and selectively transmitting data from one or more notified device resources across the open communication channel prior to closure thereof;

further comprising the step of allowing an unused communication channel to idle for a predetermined duration until closure, and wherein the step of notifying all device resources that have requested such notification of an idle open communication channel occurs upon the beginning of the predetermined duration of idling.

8. The method of claim 7, wherein the step of notifying all device resources that have requested such notification of an idle open communication channel occurs within the predetermined duration.

9. A wireless device that selectively opens and closes a communication channel to a wireless network, the wireless device including a computer platform and a plurality of device resources that selectively utilize a communication channel to communicate with other computer devices across the network, each device resource selectively requesting to be notified of an idle open communication channel, and wherein the wireless device notifies all device resources that have requested such notification upon an idle open communication channel occurring, and each notified device resource selectively transmitting data across the open communication channel prior to closure thereof, and wherein the device resources include a communication interface, and each device resource prompts the communication interface for notification of an idle open channel, and the communication interface records such prompts and notifies all device resources that so prompted the communication interface upon an idle open communication channel occurring.

10. A wireless device that selectively opens and closes a communication channel to a wireless network, the wireless device including a computer platform and a plurality of device resources that selectively utilize a communication channel to communicate with other computer devices across the network, each device resource selectively requesting to be notified of an idle open communication channel, and wherein the wireless device notifies all device resources that have requested such notification upon an idle open communication channel occurring, and each notified device resource selectively transmitting data across the open communication channel prior to closure thereof, and wherein the wireless device allows an unused communication channel to idle for a predetermined duration until closure, and notifies all device resources that have requested such notification of an idle open communication channel upon the predetermined duration of idling beginning.

11. The wireless device of claim 10, wherein the wireless device notifies all device resources that have requested such notification of an idle open communication channel within the predetermined duration.

12. In a computer readable medium, a program that directs a wireless device that each selectively opens and closes a communication channel on a computer network, the device including a plurality of device resources that selectively utilize communication channels to communicate with other devices across the network, to perform the steps of:

requesting, from one or more device resources, notification of an idle open communication channel;

opening a communication channel from the wireless device to the wireless network;

upon the open communication channel becoming idle, notifying all device resources that have requested such notification; and selectively transmitting data from one or more notified device resources across the open communication channel prior to closure thereof;

wherein the step of requesting, from one or more device resources, notification of an idle open communication channel is sending a flag to request notification of an open channel; and wherein the step of notifying all device resources that have requested such notification is notifying all device resources that sent a flag upon an idle open communication channel occurring.

13. In a computer readable medium, a program that directs a wireless device that each selectively opens and closes a communication channel on a computer network, the device including a plurality of device resources that selectively utilize communication channels to communicate with other devices across the network, to perform the steps of:

requesting, from one or more device resources, notification of an idle open communication channel;

opening a communication channel from the wireless device to the wireless network;

upon the open communication channel becoming idle, notifying all device resources that have requested such notification; and selectively transmitting data from one or more notified device resources across the open communication channel prior to closure thereof;

wherein the step of requesting, from one or more device resources, notification of an idle open communication channel is prompting to request notification of an open channel;

wherein the program further comprises the step of recording such prompts; and wherein the step of notifying all device resources that have requested such notification is notifying all device resources that prompted.

14. In a computer readable medium, a program that directs a wireless device that each selectively opens and closes a communication channel on a computer network, the device including a plurality of device resources that selectively utilize communication channels to communicate with other devices across the network, to perform the steps of:

requesting, from one or more device resources, notification of an idle open communication channel;

opening a communication channel from the wireless device to the wireless network;

upon the open communication channel becoming idle, notifying all device resources that have requested such notification; and selectively transmitting data from one or more notified device resources across the open communication channel prior to closure thereof;

wherein the program further directs the wireless device to perform the step of allowing an unused communication channel to idle for a predetermined duration until closure, and wherein the step of notifying all device resources that have requested such notification of an idle open communication channel occurs upon the beginning of the predetermined duration of idling.

15. The program of claim 14, further directing the wireless device wherein the step of notifying all device resources that have requested such notification of an idle open communication channel occurs within the predetermined duration.

* * * * *